July 17, 1923.
J. M. LEIDECKER ET AL
APPARATUS FOR SPOOLING WIRE
Filed Sept. 18, 1922
1,462,014
2 Sheets-Sheet 2
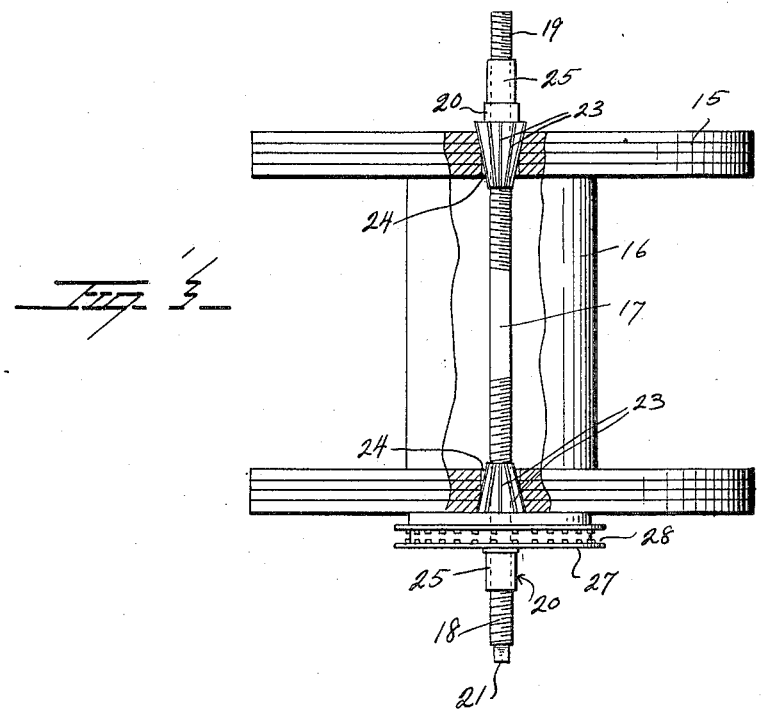
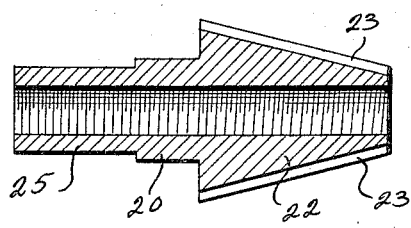
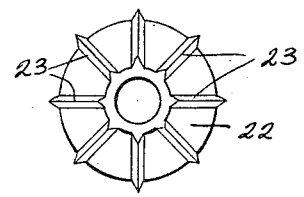
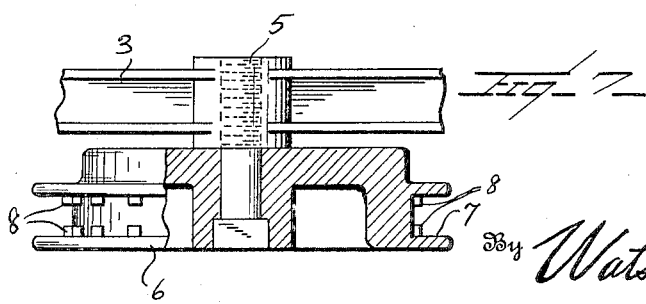
Inventors
J. M. Leidecker
& J. G. Burch
By Watson E. Coleman
Attorney Patented July 17, 1923.

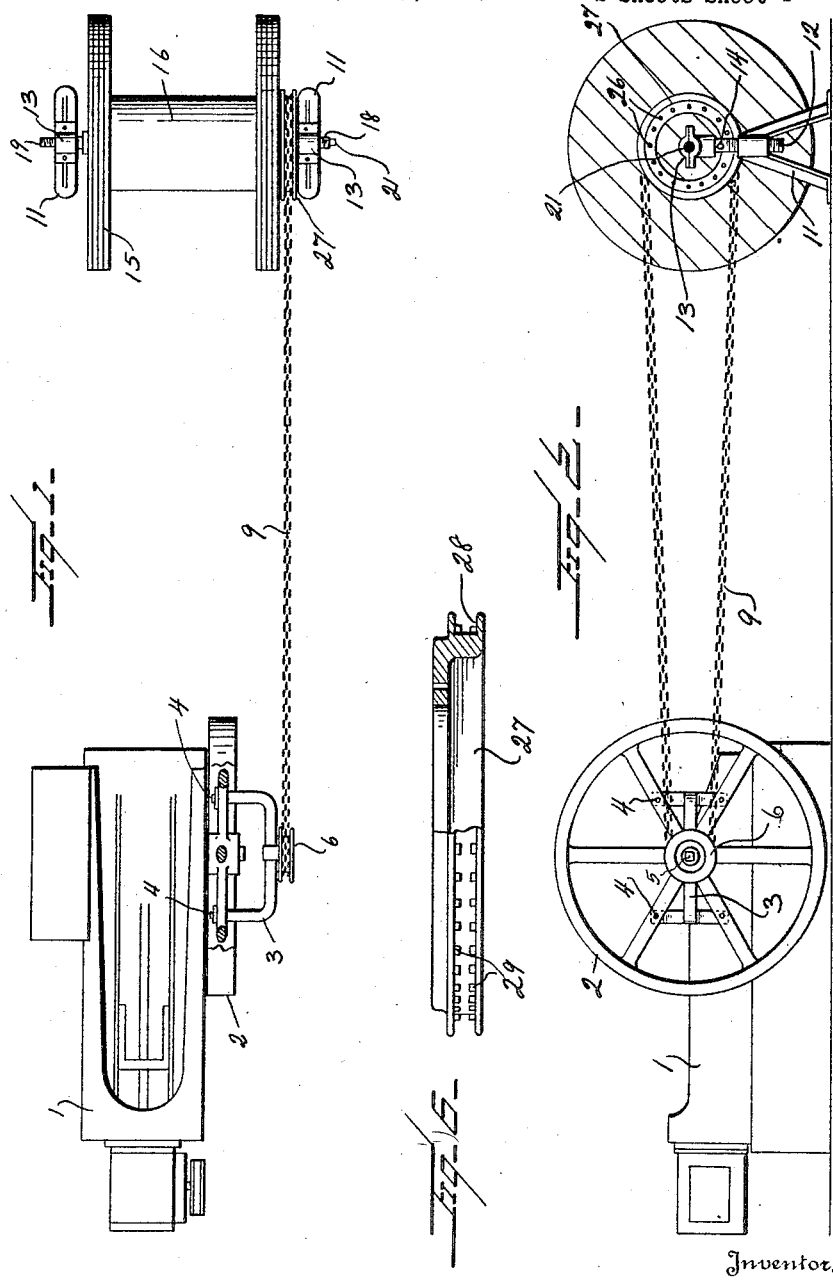

1,462,014

UNITED STATES PATENT OFFICE.

JOSEPH M. LEIDECKER AND JULUS G. BURCH, OF BARTLESVILLE, OKLAHOMA.

APPARATUS FOR SPOOLING WIRE.

Application filed September 18, 1922. Serial No. 588,872.

*To all whom it may concern:*

Be it known that we, JOSEPH M. LEI-DECKER and JULUS G. BURCH, citizens of the United States, residing at Bartlesville, in the county of Washington and State of Oklahoma, have invented certain new and useful Improvements in Apparatus for Spooling Wire, of which the following is a specification, reference being had to the accompanying drawings.

The purpose of the present invention is to provide an apparatus of this kind, which dispenses with the now used method for spooling wire, which consists in passing a pipe through the spool as a bearing, the pipe to be mounted on some suitable support.

Another purpose is to provide an improved mounting for the spool consisting of a shaft with means to clamp the spool thereon, in combination with a grooved pulley operatively connected to and driven by a suitable engine or other power, for imparting revoluble movements to the spool, on which the wire may be wound.

Still another purpose is the provision of rib cones connected to the spool shaft by right and left threads, for clamping the spool upon the shaft, in such wise as to prevent detachment thereof, while the wire is being wound upon the spool.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a plan view of the improved wire spooling apparatus constructed in accordance with the invention;

Figure 2 is a view in side elevation of the same;

Figure 3 is an enlarged plan view of the spool, showing the end portions thereof in section, and illustrating a pulley fastened to one end of the spool for driving the same;

Figure 4 is an enlarged detail sectional view through one of the ribbed cones, which assists in fastening the spool to the shaft;

Figure 5 is an end view of said cone;

Figure 6 is an edge view of the pulley which is fastened to the spool or drum;

Figure 7 is an enlarged detail sectional view showing how a pulley is mounted upon the fly wheel of the engine;

Referring to the drawings, 1 designates an engine or other motor, and which is provided with a fly wheel 2. A bracket 3 is fastened at 4 to the fly wheel, and secured at 5 to the bracket is a pulley 6 which has a groove 7. The opposed walls of the groove are provided with lugs 8, which are engaged by the links of a drive chain 9. While a chain of this character is herein employed, it is obvious that any other suitable endless driving element may be used.

In order to support a spool or drum, on which wire is to be wound, suitable supports 11 are provided, there being screws 12 mounted for vertical movements in the supports, for the purpose of supporting the bearings 13. In fact the screws 12 are swiveled to the bearings in any suitable manner (not shown) and the screws have transverse openings 14 for the reception of handles, whereby the screws may be rotated, for the purpose of raising and lowering the bearing.

The spool or drum 15 on which the wire is adapted to be wound may be of the usual construction, and passing through the cylindrical body 16 of the spool is a shaft 17, provided with right and left threads 18 and 19 at its ends. Sleeves 20 are engaged with the right and left threads, so that by threading the shaft 17 in the proper direction (by engaging the square extremity 21 of the shaft with a suitable wrench not shown), the sleeves may be rotated toward each other. A reverse rotation of the shaft will move the sleeves away from each other. The inner portions of the sleeves have conical shaped bodies 22, which are provided with longitudinally arranged ribs 23. These ribs are V-shaped and sharpened on their outer edges, so as to bite into the bores 24 of the heads of the spool, thereby clamping the spool in position, and causing the spool to rotate with the sleeves, as well as with the shaft. The remote ends 25 (which are cylindrical) of the sleeves are mounted in the bearings 13, which are swiveled to the upper ends of the screws 12. Fitting on one of the sleeves adjacent its conical body and bolted at 26 to one of the heads of the spool is a pulley 27, which is of larger diameter than the pulley 6 carried by the fly wheel 2. The pulley 27 has a groove 28, the opposed walls of which have lugs 29, which are similar to the lugs 8 on the pulley 6, and are likewise engaged by the links of the drive chain 9.

Obviously the wire to be wound upon the spool may have its end connected thereto in any suitable manner, and through the medium of the engine 1 or any other suitable motor power is transmitted to the spool, and the wire may be wound thereon.

To remove the spool, the sleeves may be loosened, and one sleeve entirely removed, thereby permitting the spool to be removed from the shaft 17, that is to say after the spool is completely wound with wire.

The invention having been set forth, what is claimed is:—

1. In an apparatus for winding wire, a supporting shaft, a spool through which the shaft passes, sleeves threaded upon the opposite ends of the shaft and having means extending into and clamping against the heads of the spool, thereby mounting the spool upon the shaft, said sleeves having cylindrical members adapted for mounting in suitable bearings, whereby the spool may be rotatably supported.

2. In an apparatus for winding wire, the combination with a spool, of a shaft having right and left threads on its ends passing through the spool, sleeves engaged with said right and left threads and provided at their inner ends with conical bodies having ribs, said conical bodies engaging into and clamping against the heads, whereby the ribs may bite into the bores of the heads of the spools, means carried by the spool and adapted to be actuated for rotating the spool and bearings rotatably receiving the outer ends of the sleeves.

3. In apparatus for winding wire, a shaft, a spool through which the shaft passes, and clamping means adjustable on the shaft to engage the spool at the ends thereof, said means being provided at the outer ends thereof with bearing engaging members.

4. In apparatus for winding wire, a shaft, a spool through which the shaft passes, and clamping means adjustable on the shaft to engage the spool at the ends thereof, said means being provided at the outer ends thereof with bearing engaging members, and shiftable supports provided at their upper ends with bearings for rotatably receiving said members.

5. In apparatus for winding wire, a shaft, a spool through which the shaft passes, and clamping means adjustable on the shaft to engage the spool at the ends thereof, said means being provided at the outer ends thereof with bearing engaging members, bearings receiving said members, and means engaged with said spool for rotating the same.

6. In an apparatus for winding wire, a supporting shaft, a spool through which the shaft passes, sleeves threaded upon the opposite ends of the shaft and having means extending into and clamping against the heads of the spool, thereby mounting the spool upon the shaft, said sleeves having cylindrical members adapted for mounting in suitable bearings, whereby the spool may be rotatably supported, and means engaged directly with the spool for connecting the same with a drive whereby the spool may be rotated.

In testimony whereof we hereunto affix our signatures.

JOSEPH M. LEIDECKER.
JULUS G. BURCH.